INVENTORS
VERL D. MOORE
JOHN D. THOMPSON

BY Christopher a Spencer
ATTORNEYS

_United States Patent Office_

3,630,873
Patented Dec. 28, 1971

3,630,873
SPUTTERING OF TRANSPARENT CONDUCTIVE OXIDE FILMS
Verl D. Moore, Kittanning, and John D. Thompson, Saxonburg, Pa., assignors to PPG Industries, Inc., Pittsburgh, Pa.
Filed Dec. 5, 1969, Ser. No. 882,688
Int. Cl. C23c 15/00
U.S. Cl. 204—192        18 Claims

ABSTRACT OF THE DISCLOSURE

A transparent conductive oxide film may be cathode-sputtered onto glass or the like more rapidly when the glass is rested upon a water-cooled metal anode. In producing films of good conductivity, under 50 ohms per unit square, using such an anode, an undesirable patterned coating sometimes develops on the glass. The appearance is unsightly, and the pattern indicates a variation in the electrical properties of the coating. This invention minimizes and even prevents the pattern development by placing a piece of fiber-glass cloth or the like between the anode and the sample to be coated.

BACKGROUND OF THE INVENTION

(1) Field of the invention

This invention relates to the production of transparent conductive oxide films on glass or similar transparent substrates by the method of cathodic sputtering.

(2) Description of the prior art

It is known that a transparent, conductive oxide film may be placed onto glass or other transparent substrates by cathodic sputtering, using a glow discharge in a near-vacuum atmosphere of argon containing a small percentage, such as 1 to 6%, of oxygen, with the glass or other substrate to be coated being positioned in the glow discharge, near to but outside of the cathode dark space.

Cathodic sputtering, as a way of producing such films has advantages over other known methods of obtaining such coatings on glass. The practice most commonly employed for obtaining such coatings on glass involves heating the glass to a very high temperature and then causing a solution of a suitable metal compound to be atomized and brought in contact with the glass, pyrolyzing on contact to form the desired coating. When the compound as so used is a chloride, the products of pyrolysis may attack the glass unless it is of special composition. Moreover, the temperatures commonly employed are so high that the pyrolysis method must be ruled out for use with glasses that cannot retain certain desired properties at temperatures above about 900° F. This means that the pyrolysis method is not used for coating glasses that are chemically strengthened by alkali-metal ion exchange at temperatures below the softening point of the glass, and glasses that are intended to remain optically flat or to be of at least mirror quality. Cathodic sputtering, which does not require heating the substrate to temperatures so high, provides an attractive way of obtaining the desired oxide film on such glasses.

Prior to the present invention, it was known that cathodic sputtering could be practiced, with the glass sample to be coated placed directly onto or close to a suitable metal anode, and that satisfactory coatings could be produced even if the anode was not provided with any cooling means. In these practices, however, the power consumption needed to be kept rather low, on the order of 2 watts per square centimeter, since otherwise the anode and the glass tend to become overheated. The time required for the production of a cathode-sputtered coating of desired thickness is related directly to the level of power consumption that can be tolerated. Other factors, such as heat losses, may make the tolerable level of power consumption greater or smaller. The rate of deposition of a sputtered coating is also influenced remarkably by the nature of the material being sputtered (e.g., a bismuth coating builds up more rapidly than one of indium, iron, or nickel).

It was then learned that by providing the anode with interiorly located serpentine cooling-water passages, it was possible to conduct the cathode-sputtering operation with the use of higher power, achieving coatings as thick and as conductive in substantially less time. When this was done, however, and especially in the production of coatings of high conductivity (under about 50 ohms per unit square), there developed the problem that the coated glass would exhibit a film pattern. Conductivity tests also revealed that the pattern was indicative of variations in the thickness of the sputtered film on the glass. The film was thickest in a path that appeared to follow a serpentine path like that of a cooling-water pipe welded to a plate-like member (anode or cathode). In our work, it was initially believed that the cooling-water pipe welded to the bottom of the anode was responsible for the pattern, but a test was conducted wherein the cathode (which was similarly water-cooled) was turned 90°, and this gave a coated specimen with the pattern turned 90°. It was somewhat surprising to learn that the pattern appeared to be caused by conditions of the cathode, which was about 86 millimeters away from the glass substrate, rather than conditions of the anode, immediately beneath the glass substrate.

Various expedients were tried in an effort to overcome the above-indicated problem. A glass plate, when placed between the sample and the anode, became warped during the sputtering operation. One trial was made with asbestos, but the asbestos gave off gases to an objectionable extent.

SUMMARY OF THE INVENTION

A transparent conductive oxide film may be cathode-sputtered onto glass or the like more rapidly when the glass is rested upon a water-cooled metal anode. In producing films of good conductivity, under 50 ohms per unit square, using such an anode, an undesirable patterned coating sometimes develops on the glass. The appearance is unsightly, and the pattern indicates a variation in the electrical properties of the coating. This invention minimizes and even prevents the pattern development by placing between the anode and the sample of glass to be coated a piece of fibrous substantially non-degassing, heat-resistant, thermally insulative material that is dimensionally stable at temperatures encountered during the sputtering operation. An asbestos tape, thoroughly fired to remove volatile matter, may be used, but for convenience, we prefer to use a suitable fiber-glass cloth.

DESCRIPTION OF THE DRAWINGS

A complete understanding of the invention may be obtained from the foregoing and following description thereof, taken together with the appended drawings, in which.

DESCRIPTION OF THE PREFERRED EMBODIMENTS

Figure 1:
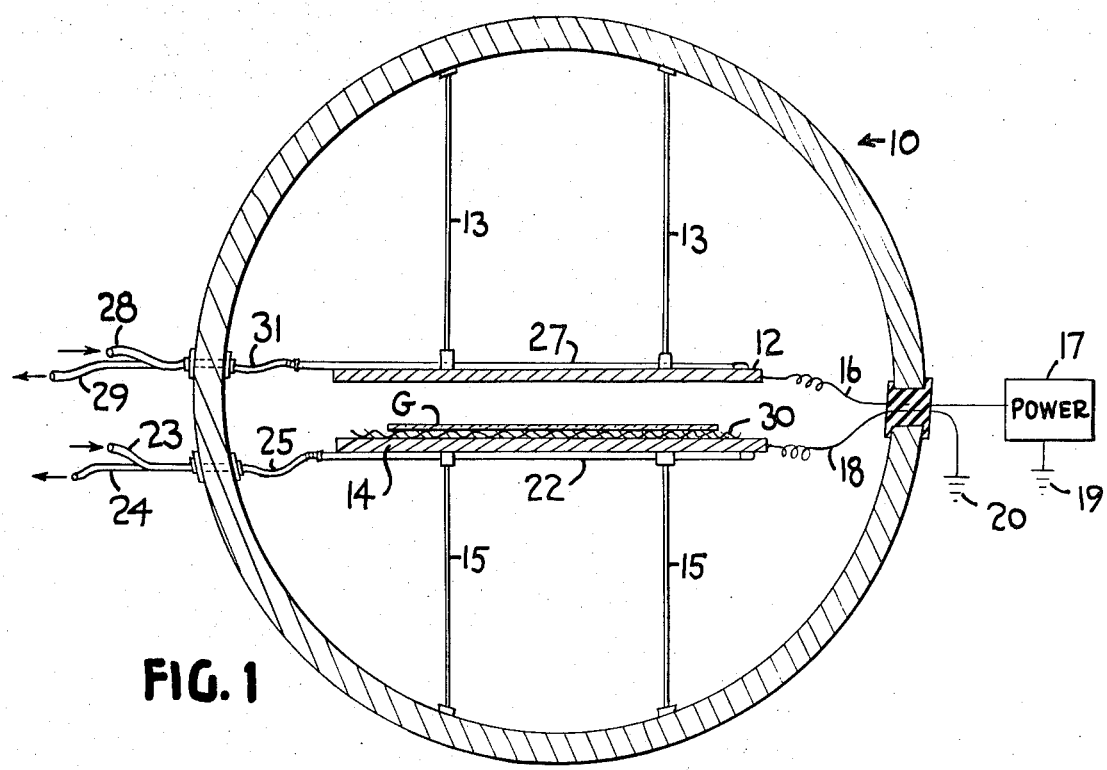
FIG. 1 is a schematic elevation view of a cathode-sputtering apparatus in accordance with the instant invention.
Figure 2:
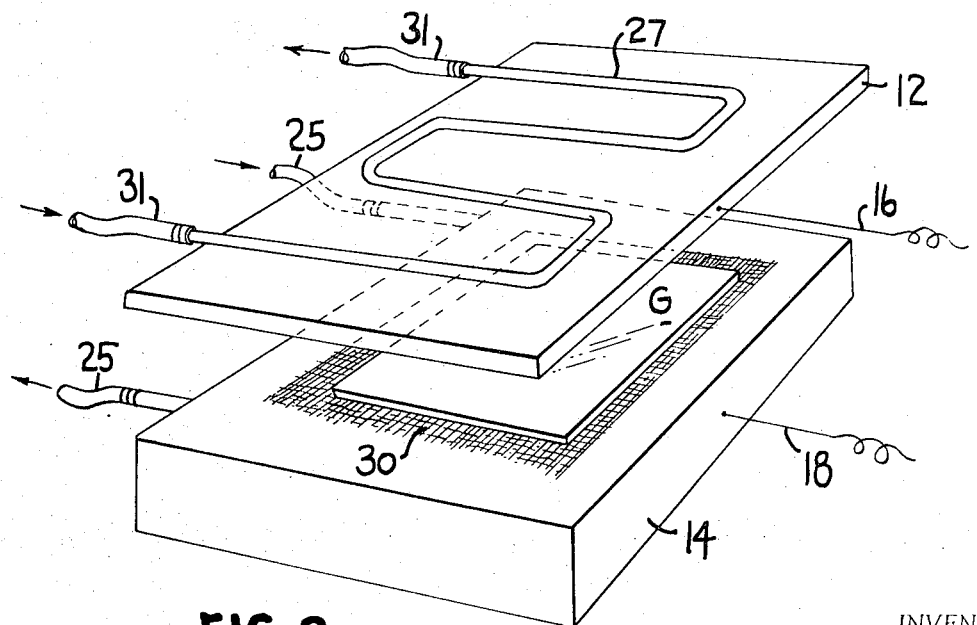
FIG. 2 is a perspective view of a portion of the apparatus of FIG. 1.

FIG. 1 shows a vacuum chamber 10, which will be understood as being provided with a suitable pump and suitable atmosphere-feed means (not shown). In the chamber 10 are a cathode 12 and an anode 14, which are suitably supported by means indicated at 13 and 15, respectively. The means 13 and 15 are such as not to permit any substantial flow of electricity therethrough. A power lead 16 is connected to the cathode 12, and leads through a suitable exterior source of power 17 to ground at 19. A lead 18 connects the anode 14 to ground at 20. As seen in FIG. 1, the anode 14 is cooled by means of a water pipe 22 welded in serpentine pattern to its bottom surface. Water is fed to the pipe 22 through a water-inlet line 23 and removed therefrom by means of a water-outlet line 24. To provide suitable insulation between the anode 14 and the chamber 10, there are provided suitable flexible conduit members 25 of rubber or the like. As best seen in FIG. 2 the cathode 12 is cooled by means of a water pipe 27 welded in serpentine pattern to its top surface. Water is fed to the pipe 27 through a water-inlet line 28 and removed therefrom by means of a water-outlet line 29. Suitable flexible conduit members 31 connect the pipe 27 to the lines 28 and 29 while insulating the cathode 12 from the chamber 10. A sample or piece of glass to be sputter-coated is indicated in FIGS. 1 and 2 at G. The parts described hereinabove may be considered conventional.

In accordance with the invention, we provide, as best seen in FIG. 2, resting on the anode 14, between it and the glass G there is a piece of substantially non-degassing, heat-resistant, thermally insulative material 30 that is dimensionally stable at temperatures encountered during the sputtering operation, such as fiber-glass cloth. Satisfactory results may be obtained with the use of fiber-glass cloth. We have obtained excellent results with the use of a fiber-glass cloth designated as No. 181, Finish No. 112, supplied by Hess, Goldsmith and Company, New York City. Satisfactory results may also be obtained with asbestos tape that has been fired under such conditions as to remove thoroughly any binder materials that may volatilize under operation conditions.

Although the invention may find some use in the production of the thinner and less conductive coatings (ones having a conductivity of about 50 to 300 ohms per unit square), it is most useful in the making of the thicker and more conductive films (under 50 ohms per unit square, and especially, coatings of between 15 and 6 ohms per unit square). The need for the invention increases when the power used in the sputtering operation is greater, when the substrate is thinner, when the substrate is of greater thermal conductivity, when the coolant is a liquid rather than a gas, and when the coolant is colder. It is to be expected that the need for the invention will vary somewhat in accordance with the chemical nature of the oxide coating. It is, accordingly, impossible to describe with certainty the various combinations of circumstances wherein the present invention will find use, but those skilled in the art will readily understand that, in instances wherein there develops in the coating an unwanted pattern that may correspond to the configuration of the coolant passages associated with the cathode, the instant invention may be expected to overcome the problem, or to aid in doing so.

Although the instant invention has been described hereinabove as being applicable to the cathodic sputtering of any transparent electroconductive coating onto glass, it was developed in connection with, and may be of particular usefulness in connection with, the production of cathode-sputtered coatings of indium oxide. Indium is a relatively slow-sputtering element, and patterned-coating problems are, accordingly, somewhat more likely to be encountered in producing coatings of it and its compounds. With the indium it takes rather a long time (in comparison) to produce a coating of given thickness, which means that the cathode-temperature inequalities have a greater length of time within which to develop or exert their effect than is the case when the metal involved is a faster-sputtering one. As those familiar with the technology of thin, transparent electroconductive oxide coatings produced upon glass are aware, conductivity is promoted by making the coating slightly oxygen-deficient and/or by doping the coating with atoms of a somewhat higher-weight element (tin in the case of indium). Hence, the instant invention also relates, in a preferred aspect, as relating to the production of thin, transparent, cathode-sputtered electroconductive coatings of oxides of 4 to 20% by weight tin, balance indium, and in particular, to coatings of such oxides that are of such thickness as to exhibit a resistivity of under 50 ohms per unit square, and even more particularly, under 15 ohms per unit square.

The foregoing invention is illustrated by the following examples:

EXAMPLE 1

To be coated, there is a piece of glass about 5 by 8 inches and about ¼ inch thick, the glass being of the kind that has been chemically strengthened by alakli-metal ion exchange below its softening point (such that the glass should not, if it is to retain its strentgh, be permitted to reach a temperature as great as about 600° F.). This piece is provided with a coating of mixed oxides of indium and tin. The finished coating is to have good light transmission (over 80% in the visible region of the spectrum) as well as good conductivity (about 15 ohms per unit square or lower). This is done by placing the above-mentioned piece of glass into a vacuum chamber that has a metal anode and a metal cathode, each provided with serpentine water-pipe means for cooling it, with there having been laid on the anode on its upper surface, facing the cathode, a piece of fiber-glass cloth of the kind indicated above, onto which the glass piece is placed. With the use of suitable conditions, as indicated below, a cathode sputtering operation is conducted.

Conditions

Absolute pressure in chamber during sputtering operation—17 millitorr.
Duration of sputtering—60 min.
Voltage between anode and cathode—3000.
Composition of atmosphere fed into vacuum chamber during sputtering—4 milliliters per minute of oxygen and 22 milliliters per minute of argon.
Power used during sputtering operation—6 kilowatts.
Separation between anode and cathode—83 millimeters.
Description of cathode—fixed type, spray-coated with about 5.6% tin, balance indium, dimensions 1 meter by 1 meter.

With the above procedure, there was obtained a coated glass piece having the desired properties and exhibiting, when examined visually, substantially no indication of the unsightly pattern mentioned above. In contrast, in a test in all respects similar, except that the fiber-glass cloth was not used and the glass was laid directly on the metal anode, there was obtained a film-coated piece of glass exhibiting such a pattern to a marked degree.

EXAMPLE 2

An indium-oxide coating was produced upon a glass substrate, under conditions the same as indicated in Example 1, except that pieces of asbestos tape of the kind hereinabove indicated as being satisfactory had been placed upon the metal anode, between it and the glass, but not coextensive with the glass. Patterning of the coating was observed in the portions of the glass substrate that did not have asbestos tape under them, but not in the portions of the glass substrate that did.

We claim:
1. In the production of a transparent, electrically conductive film upon a substrate by cathodic sputtering, said substrate being supported by a metal anode and in face-to-face relationship between said metal anode and a cooled metal cathode, said sputtering being conducted while said cathode is cooled, the improvement comprising:
interposing between said substrate and said anode a piece of fibrous substantially non-degassing, heat-resistant, thermally insulative material that is dimensionally stable at temperatures encountered in the sputtering operation.

2. An improvement as defined in claim 1, characterized in that said material is a piece of fiber-glass cloth.

3. An improvement as defined in claim 1, characterized in that said material is a piece of asbestos tape that has been fired to remove binder material therein volatilizable under conditions of the sputtering operation.

4. An improvement as defined in claim 1, characterized in that said material is coextensive with the face of said substrate that faces said anode during said cathode sputtering.

5. An improvement as defined in claim 4, characterized in that said material is a piece of fiber-glass cloth.

6. An improvement as defined in claim 4, characterized in that said material is a piece of asbestos tape that has been fired to remove binder material therein volatilizable under conditions of the sputtering operation.

7. An improvement as defined in claim 1, characterized in that said film comprises a mixture of oxides of 4 to 20 weight percent of tin, balance indium.

8. An improvement as defined in claim 7, characterized in that said material is a piece of fiber-glass cloth.

9. An improvement as defined in claim 7, characterized in that said material is a piece of asbestos tape that has been fired to remove binder material therein volatilizable under conditions of the sputtering operation.

10. An improvement as defined in claim 1, characterized in that said cathode sputtering is continued with said material interposed between said substrate and said anode until said resultant film has a resistivity of under about 50 ohms per unit square.

11. An improvement as defined in claim 10, characterized in that said material is a piece of fiber-glass cloth.

12. An improvement as defined in claim 10, characterized in that said material is a piece of asbestos tape that has been fired to remove binder material therein volatilizable under conditions of the sputtering operation.

13. An improvement as defined in claim 10, characterized in that said material is coextensive with the face of said substrate that faces said anode during said cathode sputtering.

14. An improvement as defined in claim 13, characterized in that said film comprises a mixture of oxides of 4 to 20 weight percent of tin, balance indium.

15. An improvement as defined in claim 14, characterized in that said material is a piece of fiber-glass cloth.

16. In apparatus for producing a transparent, electrically conductive film upon a substrate by cathodic sputtering, the combination with:
a vacuum chamber,
a cathode in said chamber, said cathode having cooling means operatively associated therewith,
an anode of metal in said chamber facing said cathode, said anode having cooling means associated therewith and a surface adapted to face said substrate in aligned relationship, and
means for supplying electrical power to said anode and said cathode,
of means comprising a stratum of fibrous substantially non-degassing, heat-resistant, thermally insulative material that is dimensionally stable at temperatures encountered in the sputtering operation, positioned on said surface of said anode that faces said substrate.

17. The combination of claim 16, characterized in that said material is fiber-glass cloth.

18. The combination of claim 16, characterized in that said material is a piece of asbestos tape that has been fired to remove binder material therein volatilizable under conditions of the sputtering operation.

References Cited
UNITED STATES PATENTS 3,235,476  2/1966  Boyd et al. _____ 204—192

JOHN H. MACK, Primary Examiner

S. S. KANTER, Assistant Examiner

U.S. Cl. X.R.

204—298